US006012001A

United States Patent [19]

Scully

[11] Patent Number: 6,012,001

[45] Date of Patent: Jan. 4, 2000

[54] METHOD AND APPARATUS FOR DETERMINING AIRCRAFT-TO-GROUND DISTANCES AND DESCENT RATES DURING LANDING

[76] Inventor: Robert L. Scully, 10 Newman Ave., Verona, N.J. 07044

[21] Appl. No.: 09/000,994

[22] Filed: Dec. 30, 1997

[51] Int. Cl.[7] .............................. G06F 19/00; G08G 5/02

[52] U.S. Cl. .............................. 701/16; 342/33

[58] Field of Search .............................. 701/5, 16, 17, 701/18; 340/973; 342/33, 34, 35; 356/5.01

[56] References Cited

U.S. PATENT DOCUMENTS

| | | | |
|---|---|---|---|
| 3,693,143 | 9/1972 | Kennedy | 340/972 |
| 3,735,398 | 5/1973 | Ross | 342/21 |
| 3,750,169 | 7/1973 | Strenglein | 342/21 |
| 3,760,414 | 9/1973 | Nicolson | 342/21 |
| 3,858,205 | 12/1974 | Ross | 342/21 |
| 4,551,723 | 11/1985 | Paterson | 340/946 |
| 5,038,141 | 8/1991 | Grove | 340/970 |
| 5,249,157 | 9/1993 | Taylor | 340/903 |
| 5,260,702 | 11/1993 | Thompson | 340/970 |
| 5,291,262 | 3/1994 | Dunne | 356/5.06 |
| 5,347,273 | 9/1994 | Katiraie | 340/903 |
| 5,359,404 | 10/1994 | Dunne | 356/5.06 |
| 5,361,070 | 11/1994 | McEwan | 342/21 |
| 5,521,696 | 5/1996 | Dunne | 356/5.07 |
| 5,529,138 | 6/1996 | Shaw et al. | 180/169 |
| 5,530,651 | 6/1996 | Uemurra et al. | 364/461 |
| 5,613,039 | 3/1997 | Wang | 395/22 |
| 5,767,766 | 6/1998 | Kwun | 340/436 |

*Primary Examiner*—Michael J. Zanelli

[57] ABSTRACT

A method and apparatus are described for the determination of the height above a landing surface and the rate of descent to the landing surface for a fixed wing or rotary wing aircraft when the aircraft is less than about 100 feet above the landing surface. The invention relies on the time-of-flight measurement of preferably short infrared pulses that are transmitted from the sensing device and reflected back to the sensing device from the landing surface. Multiple sensors can be used for redundancy. For each sensing unit the distance is determined by a conversion of the time-of-flight information into a distance reading. The rate of descent is determined from successive distance determinations. An additional algorithm determines if the rate of descent is excessive for the distance above the landing surface and generates an alarm such as an audible or visual signal.

9 Claims, 4 Drawing Sheets

METHOD AND APPARATUS FOR DETERMINING AIRCRAFT-TO-GROUND DISTANCES AND DESCENT RATES DURING LANDING

BACKGROUND

In landing small aircraft and helicopters the distance to the runway or landing surface is an important parameter that in most cases has to be judged by the pilot and is learned through training and experience. Conditions such as encountered in landing small aircraft at night and landing emergency helicopters in unforeseen circumstances require additional skill and experience.

SUMMARY OF THE PRESENT INVENTION

With the above considerations in mind, a system that could provide accurate information on distance to the landing surface and descent rate to the landing surface within the last 100 feet of descent to the landing surface would provide an additional measure of safety.

The method and apparatus of the present invention projects at least one and preferably several beams towards the landing surface from the aircraft. Preferably, the invention operates within a range of approximately 100 feet. Preferably, the invention is implemented in a system comprising a control unit and multiple transmitting and sensing units that working together (1) locate the landing surface, (2) by time-of-flight analysis calculate the distance to the surface, (3) provide to the aircraft operator visual indication of the distance and descent rate to the landing surface, and (4) provide to the aircraft operator visual and/or audible alarm indication of excessive descent rate.

Advantageously, the system is implemented using pulsed infrared laser transmitters, photodiode receiver circuits including amplification and signal conditioning, a digital clock for elapsed time measurement, one or more digital signal processors or microprocessors for system control and algorithm realization, a display module for indication of distance and descent rate to the landing surface, and an alarm unit such as a visual and/or audible alarm for excessive descent rate.

The system relies on the principle of the time-of-flight measurement of short infrared pulses to determine the distance to an accuracy of approximately several inches. The distance information is then used to provide an accurate visual indication of the aircraft height above the landing surface. The system is designed for use in landing and would not have to be active otherwise. The system can be automatically triggered on descent through a preset altitude or can be manually activated. The range of the system is predicated on use during landing and maximum range preferably is of the order of 100 feet. The closer the aircraft to the landing surface, i.e. the smaller the distance, the more critical is the information to the aircraft operator. With the short time pulses being employed, the resolution is of the order of several inches. The system can comprise a single sensor unit or multiple sensor units. At least two independent sensor units are recommended for redundancy. Since the system determines distance above the landing surface for heights of the order of 100 feet or less, it can also be used to provide rate of descent information in this distance range. The system can be employed on fixed wing aircraft or rotary wing aircraft (helicopters).

BRIEF DESCRIPTION OF THE DRAWINGS

These and other objects, features and advantages of the invention will be more readily apparent from the following detailed descriptions of the invention in which.

DETAILED DESCRIPTION OF THE PREFERRED EMBODIMENT

Figure 1:
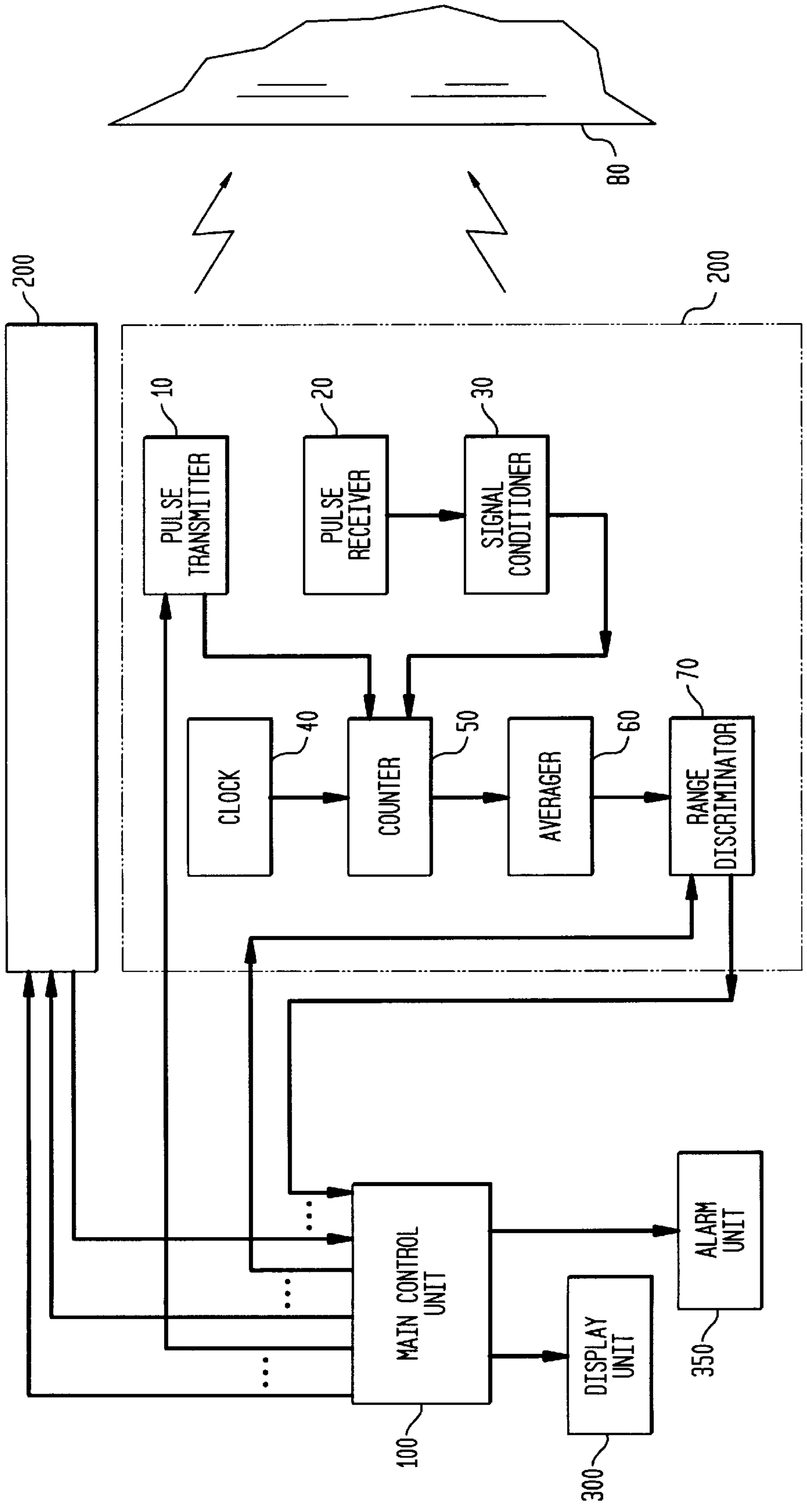
FIG. 1 is a functional block diagram of the preferred embodiment of the invention.

As shown in FIG. 1, the system of the present invention comprises a main control unit 100 and at least one, and preferably several, rangefinder units 200. Each rangefinder unit comprises a pulse transmitter 10, a pulse receiver 20, a signal conditioner 30, a clock 40, a counter 50, and averager 60 and a range discriminator 70.

Control unit 100 sets the firing sequence of the individual units, stores data from the rangefinder units, provides system analysis and provides output for display of system parameters in the display unit 300 and for activation of alarms in alarm unit 350. Illustratively, control unit 100 is a conventional microprocessor, microcontroller, or a digital signal processor.

Each individual rangefinder unit 200 measures the distance to the reflecting surface in its sensing direction through the measurement of the time-of-flight of a short infrared pulse. Each transmitter 10 projects a narrow beam infrared pulse and each receiver unit 20 detects reflected return pulses and provides initial amplification. Pulses are reflected from landing surface 80. Illustratively, each transmitter operates at a pulse rate of 60 kHz, so that a single pulse is emitted every 16.7 $\mu$seconds. Return signals are amplified and gain adjusted in signal conditioner 30, in order to provide a uniform return signal for further analysis. A digital clock 40 and counter 50 are used to determine the time interval between the initiation of the transmitted pulse and the return of the reflected pulse. In particular, the signal from transmitter 10 causes counter 50 to begin counting clock pulses when an infrared pulse is emitted by the transmitter; and a signal from receiver 20 through signal conditioner 30 causes counter 50 to stop counting when the reflected pulse is received by receiver 20. The count is then provided to the data averager 60. The data averager 60 collects and stores a rolling average of a predetermined number of successive readings (e.g. ten). The average reading is provided to the range discriminator 70, which tests to see if the reading is equal to or less than the preset sensing limit.

In the preferred embodiment of the invention the time-of-flight is determined for pulses that are returned within a window of approximately 200 nanoseconds from the initiation of the transmitted pulse. For return signals of greater time delays, the response is set to an arbitrarily high value by the range discriminator 70. The time-of-flight data is provided to the main control unit 100 which converts the reading to a distance value and transmits this value to the display unit 300. For distances greater than the preset range limit the control unit transmits a suitable indication (e.g. a single horizontal line), denoting system not in range, to the display unit 300. For return signals less than the 200 nanoseconds, the main controller 100 provides a distance reading to display unit 300. Since the speed of light is approximately 1 foot per nanosecond, this effectively limits the sensing distance of the preferred embodiment to 100 feet.

The main control unit 100 uses the averaged time-of-flight data and the polling frequency to determine the descent rate.

The descent rate is transmitted to display unit 300 and if necessary a signal is transmitted to alarm unit 350 to activate alarms.

Advantageously, each transmitter unit 10 is an infrared laser diode that produces a fast rise time pulse. Pulse width is of the order of one nanosecond or smaller. A beam width of approximately 10 degrees or less is formed. Advantageously, the receiver 20 is a photodiode or avalanche photodiode, and the signal conditioner 30 provides uniform response to reflected pulses that are received by the receiver.

All of the rangefinder units 200 are polled by the main controller 100, which maintains the current sensor channel reading until updated.

Display unit 300 presents a visual indication of the sensor reading. For a single unit system this would be a single distance value. The distance indicated would be the distance the aircraft would have to descend for the landing gear to be in contact with the ground.

At least two sensors are recommended for redundancy. The display for such a system can take several alternatives. Both values can be displayed in a pattern corresponding to the respective sensor locations, i.e. right and left. Alternatively the two values can be combined to give an averaged reading that is displayed. If the two sensor units yield readings outside a predetermined percentage limit, then the display unit would indicate system inoperable. No distances would be displayed until a preset limit (e.g. 10 to 100 feet) had been reached. From that point on, distance would be displayed in feet to one decimal place. The rate of descent can also be displayed in a similar manner.

Figure 2:
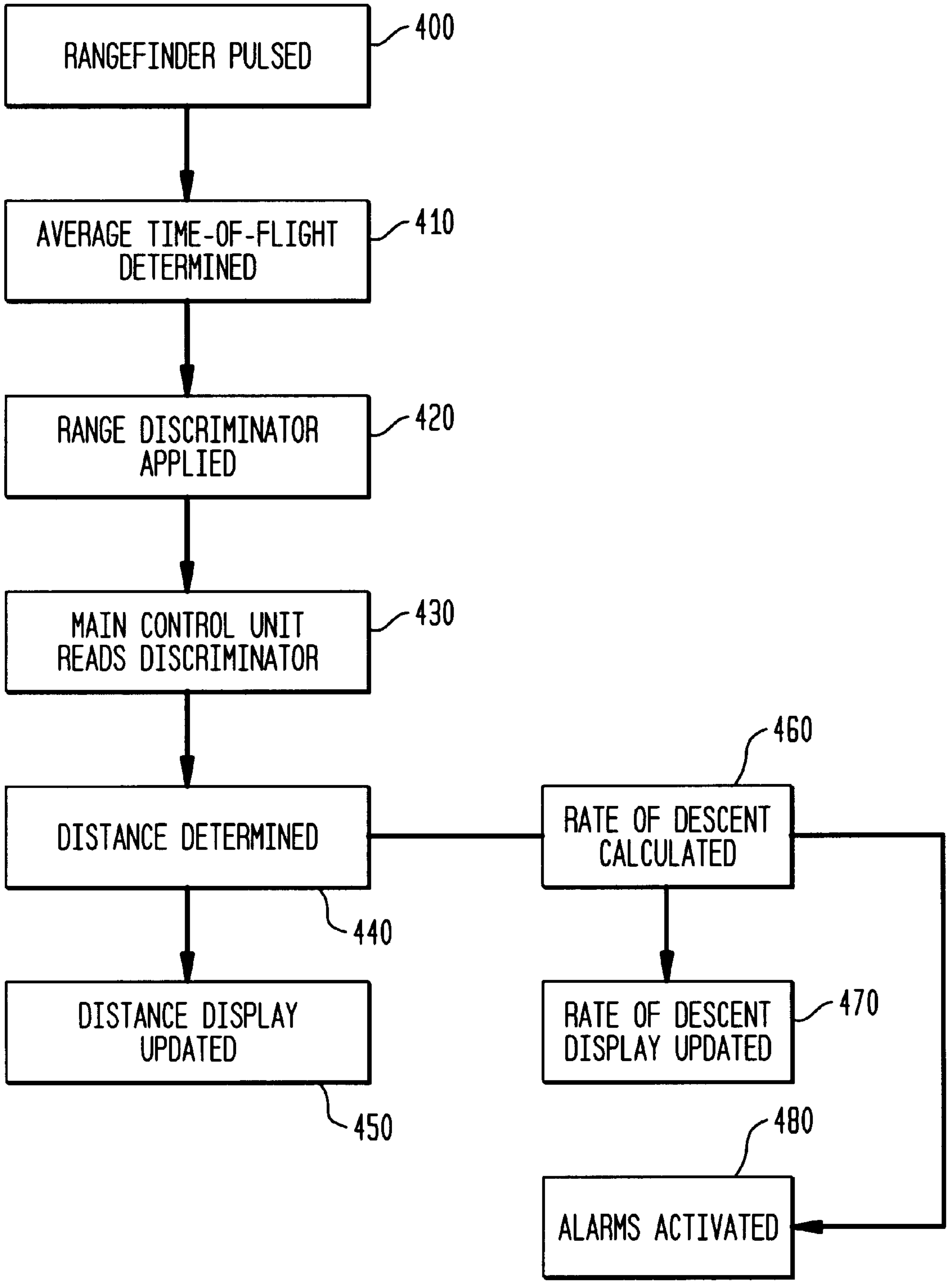
FIG. 2 is a flow chart illustrating the processing of information within the system.

The time reading of the transit time of the reflected pulse constitutes the basic measured parameter of the system. The time measurement of each rangefinder is used as a measure of the distance to the surface that reflects the transmitted pulse. A flowchart depicting the operation of the system is set forth in FIG. 2. At step 400, control unit 100 triggers the pulse transmitter 10 of each rangefinder unit so that each transmitter operates at a pulse repetition rate of $6.0\times10^4$ pulses per second. At step 410, an average time-of-flight is determined by the system averager 60. At step 420, the range discriminator 70 is applied to the averaged time-of-flight determination to ascertain whether the measurement falls within the limit for the sensor channel. At step 430 the main control unit reads the range discriminator and in step 440 converts the reading into a distance value. In step 450 this reading is provided to the display unit 300. In parallel, in step 460 the main control unit 100 calculates the rate of descent based on successive stored distance values for the rangefinder channel and the frequency of polling the channel. The main control unit 100 then provides descent rate output to visual display 300 in step 470, and to alarm unit 350 in step 480.

The main control unit 100 repeats the process for the next rangefinder unit 200, and continuously provides update to the display unit 300 and alarm unit 350. The response of the individual rangefinder units are independent of each other, with each one providing a distance value corresponding to its respective location.

Figure 3:
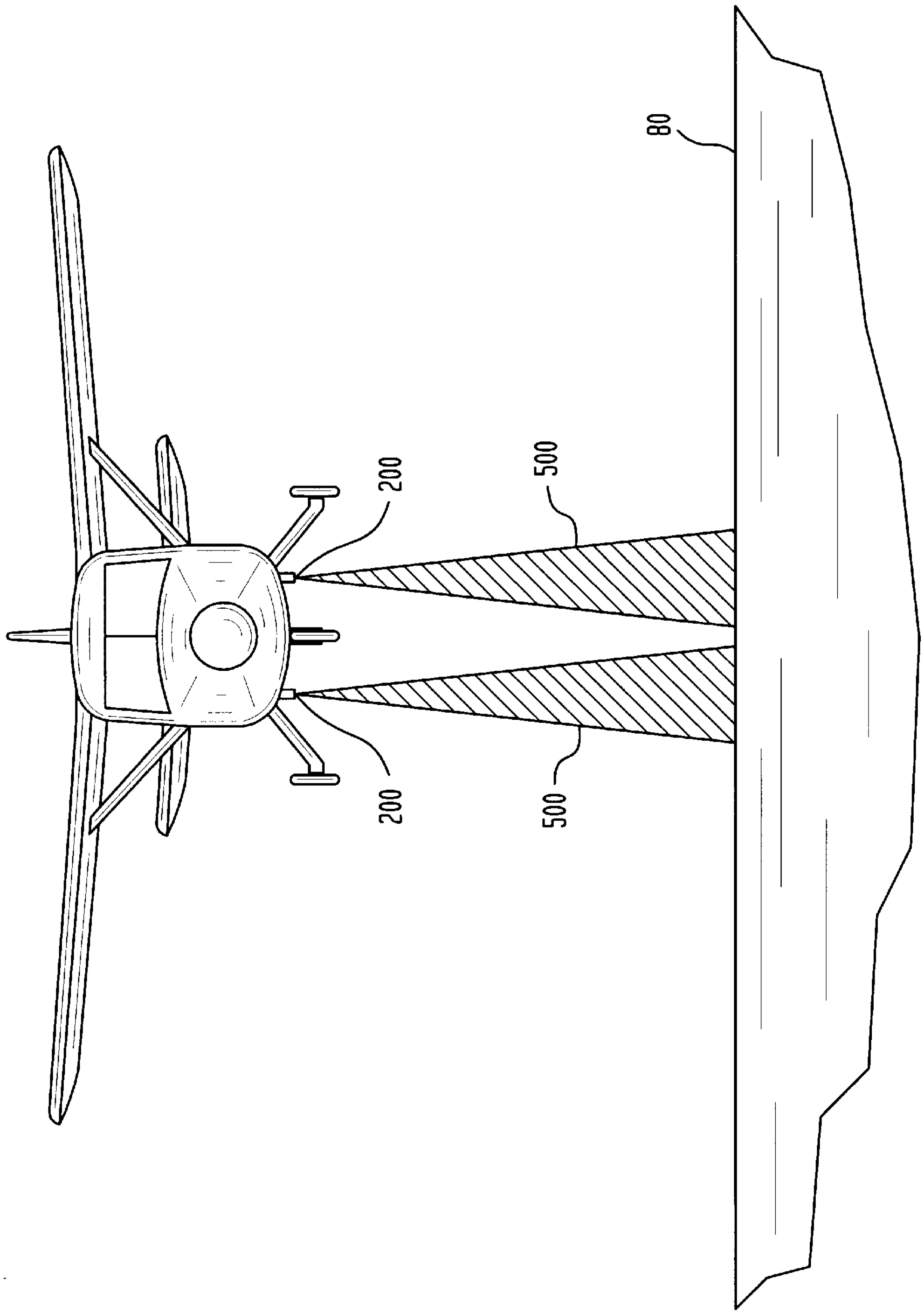
FIG. 3 is a schematic drawing illustrating the invention as applied to a small fixed wing aircraft.

FIG. 3 illustrates the concept of the system as applied to a small aircraft. In this embodiment two rangefinder units 200 are mounted on the underside of the aircraft. Pulsed beams 500, are directed to landing surface 80, and returned by reflection to the rangefinder units 200.

The distance to the landing surface is given by the equation:

$$D=(c\times T)/2$$

where D is the distance, T is the transit time of the reflected pulse and c is the velocity of light. Since the speed of light is approximately 1 foot per nanosecond, a range of 10 feet corresponds to transit times of 20 nanoseconds. At 2 to 4 feet above the landing surface the transit times are in the range of 4 to 8 nanoseconds. With the beams operated at 60 kHz, the system is updated essentially instantaneously.

Since the location of the rangefinders places them at some small height relative to the landing surface when on the ground, the main control unit 100 adjusts distance readings presented to the display unit 300 such that the distance indicated would indicate zero distance when the aircraft is on the ground.

The rate of descent is given by the equation:

$$R=-(D_n-D_{n-1})\times f$$

where R is the descent rate in ft/sec, $D_n$ and $D_{n-1}$ are successive distance determinations in feet from a specific rangefinder channel, and f is the frequency in $sec^{-1}$ that the main control unit 100 polls the specific rangefinder channel. As written, the equation gives a positive value for descent rate, since $D_n$ is less than $D_{n-1}$.

FIG. 3 shows two rangefinder units 200. These can be operated simultaneously. However to preclude interference between the two units, they can be operated sequentially, with one unit operated for a set number of pulses, e.g. 100, and then the other unit pulsed for the same number of times.

In a crosswind a small aircraft might land with a slight tilt, with one wing tip higher than the other, placing the rangefinders at slightly different heights relative to the landing surface. With a tilt as large as 10 degrees, two rangefinder units spaced 24 inches apart and symmetrically placed with regard to the center of mass of the aircraft, will read 101.5 feet at a real height of 100 feet above the landing surface, and 10.2 feet at a height of 10 feet above the landing surface. The closer to the landing surface the smaller the error due to any tilt, and the closer to the landing surface the smaller the tilt should be.

Figure 4:
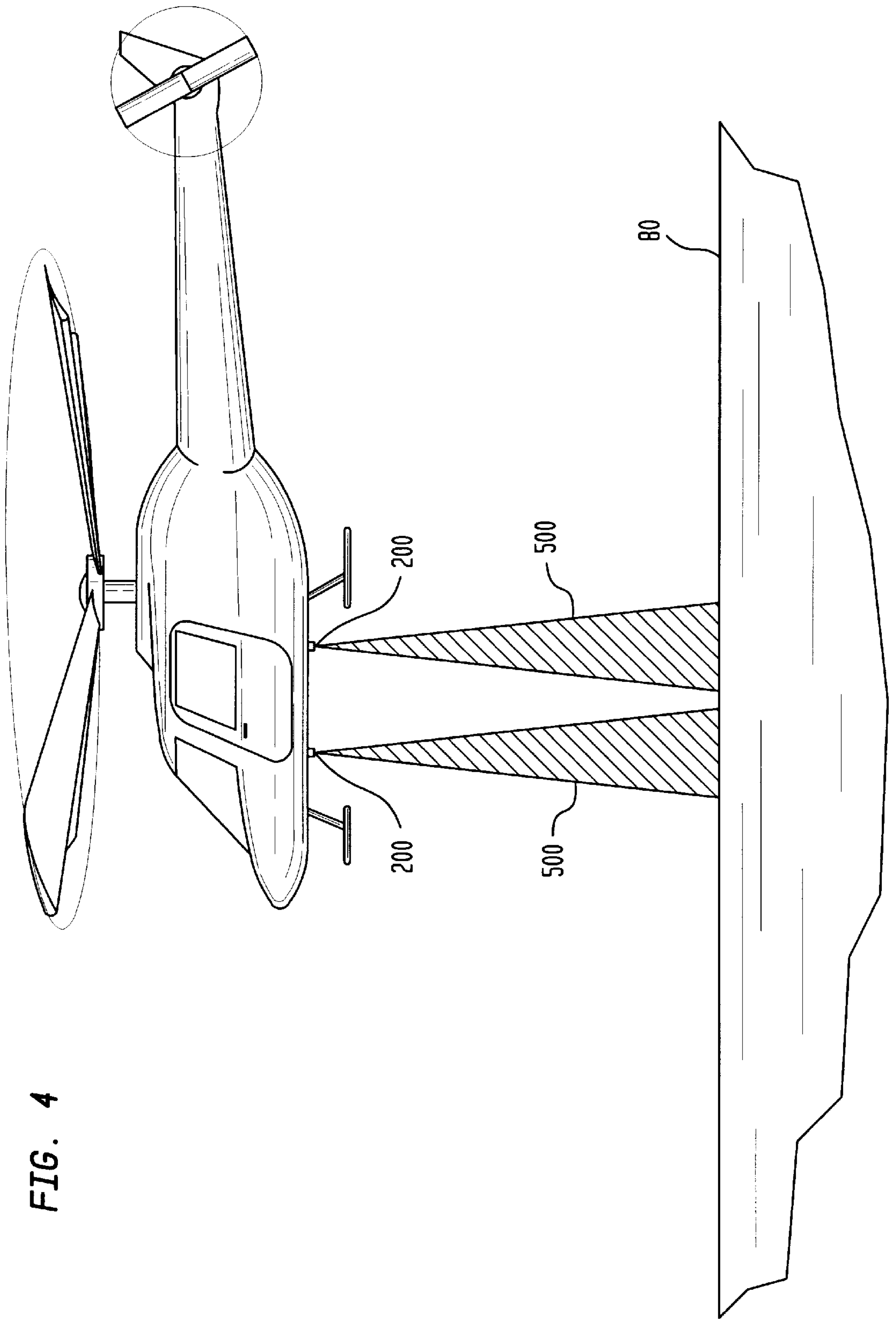
FIG. 4 is a schematic drawing illustrating the invention as applied to a helicopter.

FIG. 4 illustrates the same concept as applied to helicopters. In FIG. 4 the rangefinder units, 200, are shown mounted along the centerline of the helicopter one in front of the other. The configuration chosen for a specific aircraft would be based on aircraft design and operating considerations.

A suitable algorithm relating distance to the landing surface and rate of descent can be used to provide an audible or visual alarm if the rate of descent for a given distance above the landing surface is excessive. This algorithm would be incorporated within the main control unit 100.

As described herein there is a single main control unit 100 and several independent rangefinder units. As will be apparent, two entirely independent systems can be utilized with separate main control units. As is also apparent, the 60 kHz frequency of the rangefinder can be varied over a wide range of frequencies and the same result achieved.

As described the rangefinders 200 are operated sequentially or in an alternating mode. As is also apparent, these rangefinder units can be operated continuously, at different frequencies, and signal processing techniques used to eliminate potential interference between adjacent units.

Other variations in the invention may be achieved by shifting more of the calculation and/or signal processing effort from the rangefinder unit 200 to the control unit 100. For example, the function of the data averager 60 and the range gate discriminator 70 might be transferred to the control unit 100. Other variations will be apparent to those skilled in the art.

What is claimed is:

1. A system for determining distance to a landing surface and rate of descent to the landing surface from a fixed wing or rotary wing aircraft comprising:

a rangefinder comprising:

a transmitter of pulses of electromagnetic radiation;

a receiver that receives radiation pulses transmitted from the transmitter and reflected by the landing surface; and a timing device for determining a time-of-flight of pulses transmitted by said transmitter and received by said receiver where the time-of-flight is less than approximately 200 nanoseconds;

means for determining the distance to said surface from time-of-flight information;

means for determining the rate of descent from time-of-flight measurement of successive pulses and a time interval between said pulses; and means for displaying the results of the distance measurement and rate of descent information to the operator of the aircraft.

2. The system of claim 1 further comprising a data averager that maintains a running average of time-of-flight information.

3. The system of claim 1 further comprising a plurality of rangefinders wherein the means for determining the distance to the landing surface considers information from each rangefinder in making its determination.

4. The system of claim 1 wherein an audio and/or visual alarm is activated if the rate of descent as a function of the distance to the landing surface exceeds a predetermined value.

5. The system of claim 1 wherein the time-of-flight is less than approximately 20 nanoseconds.

6. The system of claim 1 wherein the transmitter is an infrared transmitter.

7. A method for determining distance to a landing surface and rate of descent to the landing surface from a fixed wing or rotary wing aircraft comprising the steps of:

transmitting from the aircraft pulses of electromagnetic radiation;

receiving said pulses at the aircraft after they are reflected from said landing surface;

determining the time-of-flight of pulses transmitted by said transmitter and received by said receiver where the time-of-flight is less than approximately 200 nanoseconds;

determining the distance to said landing surface from the time-of-flight information;

determining the rate of descent to said surface from time-of-flight measurement of successive pulses and a time interval between said pulses; and displaying to a pilot of the aircraft a measure of the distance to the landing surface and the rate of descent to the landing surface.

8. The method of claim 7 wherein an audio and/or visual alarm is activated if the rate of descent as a function of the distance to the landing surface exceeds a predetermined value.

9. The method of claim 7 wherein the distance to the landing surface is less than approximately 10 feet.

* * * * *